US008599258B2

(12) United States Patent
Ehlgen

(10) Patent No.: US 8,599,258 B2
(45) Date of Patent: Dec. 3, 2013

(54) METHOD FOR CALIBRATING AN ASSEMBLY USING AT LEAST ONE OMNIDIRECTIONAL CAMERA AND AN OPTICAL DISPLAY UNIT

(75) Inventor: Tobias Ehlgen, Tuebingen (DE)

(73) Assignee: Daimler AG, Stuttgart (DE)

( * ) Notice: Subject to any disclaimer, the term of this patent is extended or adjusted under 35 U.S.C. 154(b) by 799 days.

(21) Appl. No.: 12/681,807

(22) PCT Filed: Sep. 23, 2008

(86) PCT No.: PCT/EP2008/008023
§ 371 (c)(1),
(2), (4) Date: Apr. 6, 2010

(87) PCT Pub. No.: WO2009/049750
PCT Pub. Date: Apr. 23, 2009

(65) Prior Publication Data
US 2010/0214412 A1  Aug. 26, 2010

(30) Foreign Application Priority Data
Oct. 16, 2007  (DE) .......................... 10 2007 049 821

(51) Int. Cl.
*B60G 1/00* (2006.01)
(52) U.S. Cl.
USPC .......................................... 348/148; 340/435
(58) Field of Classification Search
USPC ................................ 348/148; 340/425.5, 435
See application file for complete search history.

(56) References Cited

U.S. PATENT DOCUMENTS

| 6,463,363 | B1* | 10/2002 | Okuda .............................. 701/1 |
| 6,985,171 | B1 | 1/2006 | Kuriya et al. |
| 7,161,616 | B1 | 1/2007 | Okamoto et al. |

(Continued)

FOREIGN PATENT DOCUMENTS

| DE | 10083445 B4 | 11/2001 |
| DE | 102007015498 A1 | 10/2007 |

(Continued)

OTHER PUBLICATIONS

Edwards et al., Design and Evaluation of a System for Microscope-Assisted Guided Interventions (MAGI), Nov. 2000, IEEE Transactions on Medical Imaging, vol. 19, No. 11.*

(Continued)

*Primary Examiner* — Joseph Avellino
*Assistant Examiner* — James Conaway
(74) *Attorney, Agent, or Firm* — Patent Central LLC; Stephan A. Pendorf

(57) ABSTRACT

A method for calibrating an assembly consisting of an omnidirectional camera (2) located on a vehicle (1) and an optical display unit. An image displayed by the display unit reproduces a perspective of an imaginary virtual camera above the object (1), an image from the virtual camera is projected into an object coordinate system and resulting coordinates ($X_W$, $X_{W,Y}$) are projected into the omnidirectional camera. During the projection of the image of the virtual camera into the object coordinate system, pixels ($x_p$) of the image of the virtual camera within an imaginary circle or ellipse (1) around the object are projected onto an imaginary plane, while pixels ($x_p$) of the image outside the circle or ellipse are transformed by the virtual camera into the object coordinate system in such a way that they are projected onto an imaginary surface that rises from the edge of the circle or ellipse.

11 Claims, 2 Drawing Sheets

(56) References Cited

U.S. PATENT DOCUMENTS

Figure 1:
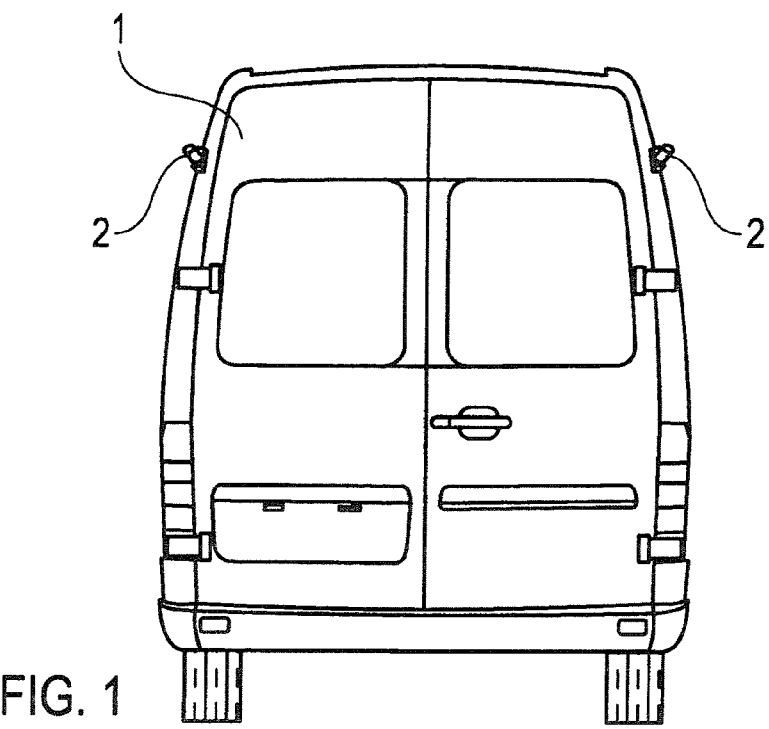

| | | |
|---|---|---|
| 7,307,655 B1 | 12/2007 | Okamoto et al. |
| 7,554,573 B2 * | 6/2009 | Mizusawa .................... 348/115 |
| 2003/0021490 A1 | 1/2003 | Okamoto et al. |
| 2004/0028292 A1 | 2/2004 | Alm et al. |
| 2004/0090320 A1 * | 5/2004 | Suzuki et al. ................ 340/435 |
| 2004/0260469 A1 | 12/2004 | Mizusawa |
| 2007/0230745 A1 | 10/2007 | Sawaki et al. |
| 2008/0266324 A1 * | 10/2008 | Lynch et al. .................. 345/634 |
| 2009/0022423 A1 * | 1/2009 | Ehlgen et al. ................. 382/284 |

FOREIGN PATENT DOCUMENTS

| | | | |
|---|---|---|---|
| EP | 1115250 A | 7/2001 | |
| EP | 1303140 A1 | 4/2003 | |
| EP | 1513101 A1 | 3/2005 | |
| JP | 2006155428 A | 6/2006 | |
| JP | 2007049276 A | 2/2007 | |
| JP | 2007091157 A | 4/2007 | |
| WO | WO 2007/087975 | * 8/2007 | ............... G06T 3/40 |

OTHER PUBLICATIONS

Tobias Ehlgen et al: "Omnidirectional Cameras as Backing-Up Aid" Computer Vision, 2007. ICCV 2007. IEEE 11th International Converence O N, IEEE, PI, Oct. 16, 2007, pp. 1-5, XP031194683 ISBN: 978-1-4244-1630-1 the whole document.

* cited by examiner

METHOD FOR CALIBRATING AN ASSEMBLY USING AT LEAST ONE OMNIDIRECTIONAL CAMERA AND AN OPTICAL DISPLAY UNIT

The invention relates to a method for calibrating an assembly consisting of at least one omnidirectional camera that is located on an object, in particular a vehicle and an optical display unit, in which an image that is displayed by the display unit reproduces a perspective of an imaginary virtual camera above the object, wherein an image from the virtual camera is projected into an object coordinate system and wherein an image of the omnidirectional camera is projected into the object coordinate system. The invention further relates to a method for the image processing and image display by means of an assembly of at least one omnidirectional camera arranged on an object, in particular a vehicle, and an optical display unit.

Omnidirectional cameras are known in principle. Omnidirectional images (also called bird's eye view images or birds eye view) can be detected therewith, whose image information contains data as for example image positions with regard to the position of detected objects or items, including the distance of the object to the omnidirectional camera.

Omnidirectional cameras are for example used for monitoring vehicle environments in front of, next to and/or behind a vehicle. Thereby, objects or items in the vehicle environment are identified by means of the omnidirectional camera. So as to be able to especially determine the position and/or the distance of the identified objects in a sufficiently exact manner, the exact position and the exact alignment of the omnidirectional camera relative to the vehicle are known. Omnidirectional cameras can in particular be used for navigating vehicles which are complex, such as HGV, for example when reversing, by presenting images recorded by the camera on an optical display to a driver. The highly distorted images of the omnidirectional camera are thereby transformed in such a manner that a bird's eye view results for the driver. It is thereby problematic that the near region around the vehicle can be detected very well, but that objects further away are not displayed.

From U.S. Pat. No. 7,161,616 B1 is known an image processing technique, where a plurality of cameras records images of an environment of a vehicle. These images are transformed in such a manner that the environment of the vehicle is interpreted as being projected onto an inner surface of a type of hemisphere or bowl, so that image points which are further away are also displayed. The distortion increases thereby from a central region of the hemisphere to the exterior. The method requires a high calculation effort.

The invention is thus based on the object to give an improved method for calibrating an assembly of at least one omnidirectional camera and an optical display unit and a method for image processing and image display by means of an assembly of at least one omnidirectional camera arranged on an object, in particular a vehicle and an optical display unit.

According to the invention, an assembly of at least one omnidirectional camera arranged on an object, in particular a vehicle and an optical display unit is calibrated with the method described in the following. A virtual camera is defined above the object, whose image is displayed by the display unit. An image of the virtual camera is projected into an object coordinate system. Coordinates resulting thereby in the object coordinate system are projected into the omnidirectional camera, or into its coordinate system.

During the projection of the image of the virtual camera into the object coordinate system, pixels of the image of the virtual camera within a circle or an ellipse, which is imagined around the object, are projected onto an imaginary plane. Pixels of the image outside the circle or the ellipse are transformed by the virtual camera into the object coordinate system in such a manner that they are projected onto an imaginary surface, which rises from the edge of the circle or the ellipse, wherein a height of the pixels on the surface in the object coordinate system is proportional to a distance of the pixel to a center of the circle or the ellipse. A near environment of the object within the circle or the ellipse can be displayed in a largely undistorted manner with a system calibrated in this manner, while regions of the environment which are further away are also displayed, which regions are not visible with known methods. The extended bird's eye view achieved in this manner generates a wide and intuitive field of view. The maneuvering, especially when reversing, will become easier for the driver.

The surface preferably has the form of a casing of a truncated cone. The casing of the truncated cone thereby has a linear rising, a projection onto this surface can thereby be calculated in a particularly simple manner. A casing of a truncated cone as a projection surface further offers the advantage that, compared to surfaces with a non-linear rising, for example with an ellipsoid, clearly diminished distortions result in the image. By using a casing of a truncated cone, a particularly intuitive plausible image display results for the driver, and in a simple manner. Distortions hereby occur at the most in the edge regions of the casing of the truncated cone, whereas displays in the image center take place without distortions in a particularly advantageous manner.

The omnidirectional camera is preferably calibrated with the help of a calibration body with regard to intrinsic parameters, which body comprises the entire field of view of the camera. The calibration body especially has the shape of a barrel, whose inner side is provided with circular markings. For the calibration of the omnidirectional camera, the markings are especially measured with subpixel exactness by means of a method described in [T. Luhmann. Nahbereichsphotogrammetrie, Herbert Wichmann Verlag, 2000. 4]. Extrinsic camera parameters, for example translation and rotation of the camera with regard to the object coordinate system are determined at the omnidirectional camera mounted at the object. Rectangular markings can be used for this. For example, a method described in [L. E. Krüger, C. Wöhler, A. Wurz-Wessel, F. Stein. In-factory calibration of multiocular camera Systems. SPIE Photonics Europe (Optical Metrology in Production Engineering), 5457:126-137, September 2004. 4,5] is used here.

Intrinsic parameters of the camera are for example a focal length, a pixel size, (width, height), an image center with regard to the respective coordinate system and distortions.

The assembly calibrated in this manner is now used in a method for image processing and image display, where an environment of the object is recorded with the omnidirectional camera and reproduced in the display unit corresponding to the calibration.

Two omnidirectional cameras are thereby preferably used, which can for example be arranged at a rear side of a vehicle in the region of a roof edge. However, a larger number of omnidirectional cameras or only one omnidirectional camera can be provided.

A region with regard to the vehicle detected by the omnidirectional cameras is in particular divided asymmetrically onto the cameras. This division is for example described in the patent specification DE 102006003538 B3 by the applicant. It is avoided thereby that further objects in the environment of the vehicle disappear from the field of view due to the assumption of a flat environment, which results from a back projection onto the imaginary plane. Each point of the object coordinate system is thereby projected behind the vehicle and to the right thereof into the omnidirectional camera arranged on the right. Each point on the left of the vehicle is projected into the omnidirectional camera arranged on the left.

Preferably, with a reversing vehicle and/or an engaged reverse gear, a drive movement is predicted in dependence on a steering angle and is superposed over the image in the display unit. The driver can estimate in this manner if he can reach a desired position of the vehicle with the current steering angle when reversing.

For simplifying the prediction, the calculation of a single track model can be applied, where respectively two wheels of one axle are modelled by a virtual wheel in the center of the axle.

Embodiments of the invention are explained in more detail in the following by means of the drawings.

Figure 2:
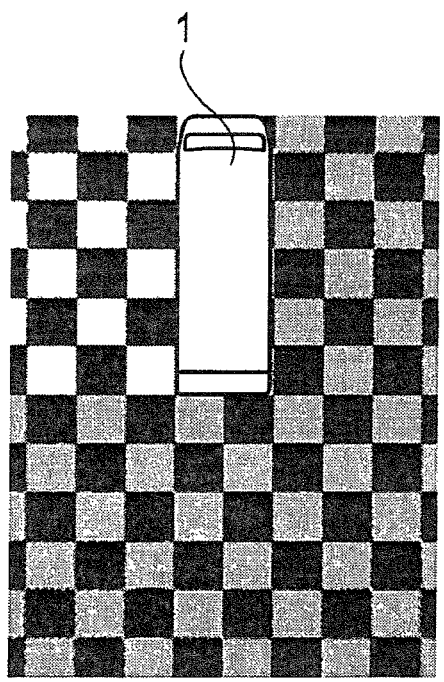
Figure 3:
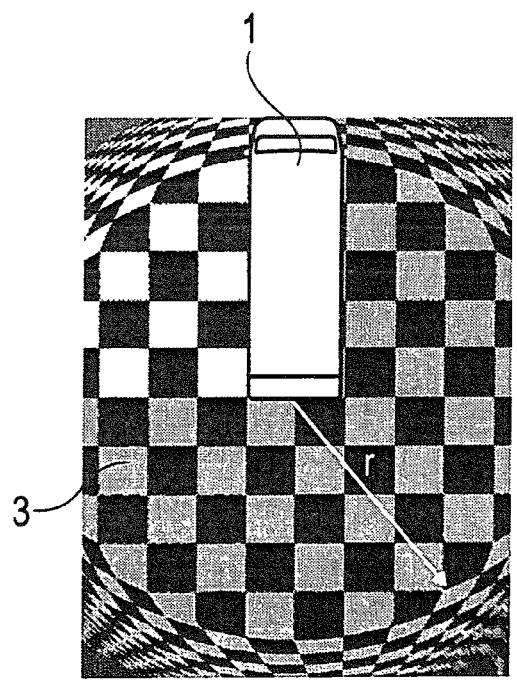
Figure 4:
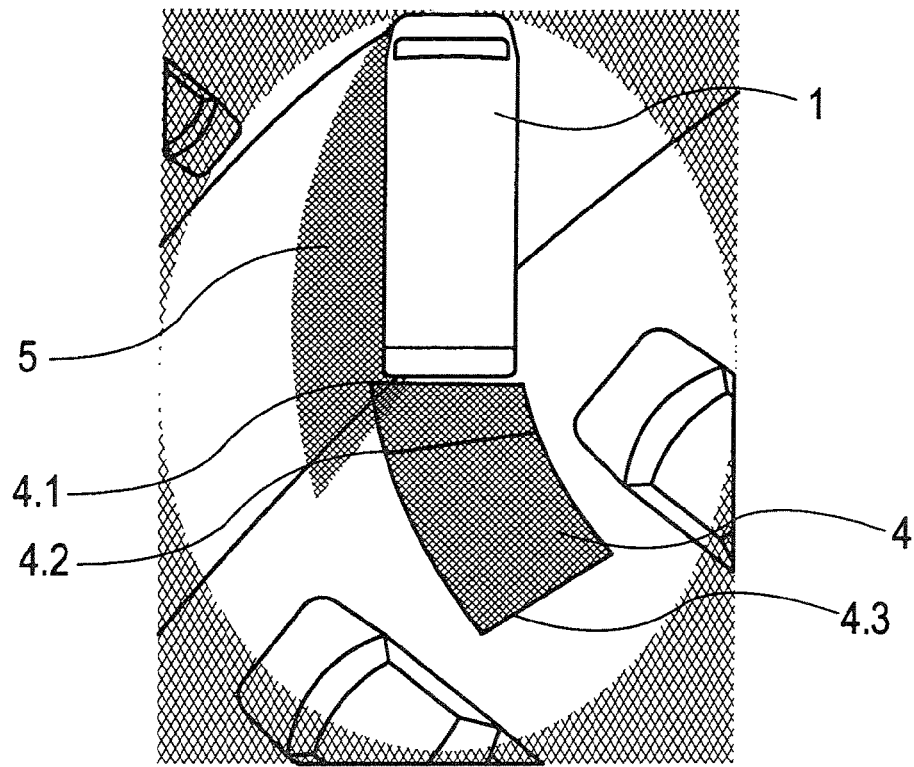
Figure 5:
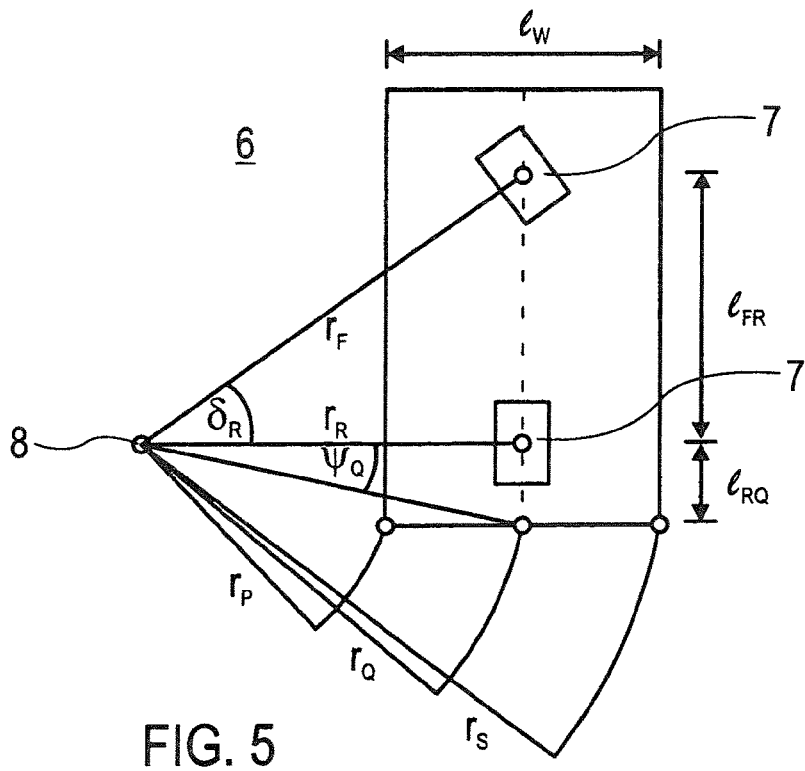

It shows thereby:

FIG. 1 a rear side of a vehicle with two omnidirectional cameras,

FIG. 2 a schematic representation of a vehicle and its environment in the standard bird's eye view, as known from the state of the art, FIG. 3 a schematic representation of a vehicle and its environment in an extended bird's eye view by means of the method for image processing and image display according to the invention, FIG. 4 a view of the vehicle and its environment in an extended bird's eye view with a superposed predicted drive movement during reversing displayed on an optical display unit in the vehicle, and FIG. 5 a single track model for predicting the drive movement.

Corresponding parts are provided with the same reference numerals in all figures.

In FIG. 1 is shown a rear side of an object 1 formed as a vehicle with two omnidirectional cameras 2. The reference numeral 1 is also used for the vehicle in the following.

The omnidirectional cameras 2 record an environment of the vehicle 1 next to and behind the vehicle 1 with a very wide angle. A processed image of the camera 1 is displayed in the vehicle 1 on a display unit, nor shown. The cameras 2 are calibrated for this with regard to the vehicle 1. Due to the fixed assembly of the camera 2, the calibration only has to be carried out once.

It is initially the aim of the calibration to generate a display of the vehicle 1 and its environment in a bird's eye view. For this, a virtual camera is defined over the vehicle 1. Each of the pixels $x_p=(x_p.x,x_p.y)^T$ of the virtual camera is projected onto an imaginary surface Y=0 (flat world assumption), wherein coordinates $X_W$ result in an object coordinate system aligned at the vehicle 1:

$$X_w = \lambda X_r + C_p$$

wherein $$\lambda = \frac{C_p \cdot y}{X_r \cdot y}$$

$$X_r = R_p X_p = R_p(x_p \cdot x, x_p \cdot y, f)^T$$

f is thereby the focal width of the virtual camera, $R_p$ and $C_p$ are the rotation and translation of the virtual camera with regard to the object coordinate system, whose coordinate origin can for example lie in the center of a bumper at the rear of the vehicle 1, wherein the y axis points vertically upwards.

The back-projected points $X_w$ are projected into at least one of the omnidirectional cameras 2, that is, into the images recorded therewith. This projection is described in detail in [C. Toepfer, T. Ehlgen. A unifying omnidirectional camera model and its applications In Omnivs, 2007. 2].

In order to avoid that further objects in the environment of the vehicle 1 disappear from the field of vision due to the assumption of a planar environment, which results from be back projection onto the imaginary plane, an asymmetric division of the region detected by the omnidirectional cameras with regard to the vehicle is chosen. Each coordinate of the object X, of the object coordinate system behind the vehicle 1 and to the right thereof is thereby projected into the omnidirectional camera 2 arranged on the right. Each point $X_W$ on the left of the vehicle 1 is projected into the omnidirectional camera 2 arranged on the left. This is described in detail in the patent specification DE 102006003538 B3 by the applicant.

In FIG. 2 is shown a schematic representation of the vehicle 1 and its environment in the standard bird's eye view achieved with an assembly from the two omnidirectional cameras 2 and the optical display unit calibrated in this manner. The shown undistorted representation is achieved by means of the calibration, as is indicated by the chess board pattern. The asymmetric division of the field of view onto the two omnidirectional cameras 2 is indicated with the different representation of the chess board pattern. A driver of the vehicle 1 can determine in this manner if there are obstacles in the environment of the vehicle 1. The method is insofar known from the state of the art.

According to the invention, the assembly from the two omnidirectional cameras 2 and the optical display unit is calibrated in such a manner that a back projection onto the imaginary plane Y=0 only takes place in an inner region 3 of the environment of the vehicle 1. This inner region 3 lies within an imaginary circle with the radius r around the vehicle 1 or the coordinate origin of the object coordinate system. Each pixel $x_p$ in the image of the virtual camera is projected back onto the imaginary plane and thereby overlapped, so that the coordinate $X_W$ results in the object coordinate system. An interpolation of the projected coordinate $X_W$ results in an intensity value for the pixel $x_p$.

Coordinates $X_W$ outside the inner region 3 are not projected onto the imaginary plane, but onto a surface rising from the edge of the circle. This means that a height $X_{W.Y}$ depends on a distance of the coordinate $X_W$ from a center of the circle:

$$X_{W.Y} = m \cdot (\|X_W\| - r)$$

r is thereby the radius of the circle and m is the rising of the surface. The extended bird's eye view resulting in this manner is shown in FIG. 3. A field of view of the driver within the inner region 3 is undistorted in this manner. The further environment of the vehicle 1 is represented outside the inner region 3.

In FIG. 4 is shown a view of the vehicle 1 and its environment in an extended bird's eye view on the optical display unit with a superposed predicted drive movement during reversing. The drive movement is represented in the manner of a first passage 4 for the movement of the rear bumper and a second passage 5 for the movement of the front bumper, within which the vehicle 1 will move corresponding to a current steering angle $\delta_R$, if the steering angle $\delta_R$ is not changed. If the steering angle $\delta_R$ is changed, the prediction has to be adapted accordingly. The line 4.1 of the passage designates the rear bumper. The line 4.2 designates a distance of for example 1 m from the bumper toward the rear, which can for example correspond to the pivoting range of rear doors of the vehicle 1. The line 4.3 designates a distance of about the length of the vehicle 1. The radius r of the circle, which surrounds the inner region 3, should at least correspond to the distance of the line 4.3 from the rear bumper.

For simplifying the prediction, a so-called single track model 6 is applied, where respectively two wheels of an axle are modelled by a virtual wheel 7 in the center of the axle. The front and the rear virtual wheel 7 are connected by a rigid line. The model is sufficient with the restriction that the vehicle 1 does not move around its longitudinal axis and that the load on the wheels remains the same. These assumptions are justified for low speeds, as they occur when reversing and maneuvering. In this connection, one/several passage(s) can be displayed in the image based on this model assumption, which permits a particularly intuitive perception of the situation for the driver and which enables a particularly easy maneuvering of the vehicle.

The following fixed parameters are considered in the single track model 6:
$I_W$ Width of the vehicle
$I_{FR}$ Distance from the front axle to the rear axle
$I_{RQ}$ Distance from the rear axle to the rear bumper
Furthermore, the following changeable parameters are used:
$\delta_R$ Steering angle
The further parameters depend on the steering angle $\delta_R$:
$r_F$ Movement radius of the front virtual wheel 7
$r_R$ Movement radius of the rear virtual wheel 7
$r_Q$ Movement radius of a center point of the rear bumper
$r_P$ Movement radius of a right outer point of the rear bumper
$\Psi_Q$ Angle between the rear virtual wheel 7 and the center of the rear bumper with regard to an instantaneous center 8 determined by the steering angle $\delta_R$ The model is formed by means of the following equations:

$$r_F = \frac{l_{FR}}{\sin\delta_R}$$

$$r_R = r_F \cos\delta_R$$

$$\tan\Psi_Q = \frac{l_{RQ}}{r_R}$$

$$r_Q = \frac{r_R}{\cos\Psi_Q}$$

The general relation $$\frac{1}{\cos^2\alpha} = 1 + \tan^2\alpha$$

leads to:

$$r_Q = \frac{r_R}{\cos\Psi_Q} = r_R\sqrt{1+\tan^2\Psi_Q} = r_R\sqrt{1+\left(\frac{l_{RQ}}{r_R}\right)^2}$$

The movement radii of the left and the right outer point of the rear bumper can be calculated analogously to $r_Q$:

$$r_P = \left(r_R - \frac{1}{2}l_W\right)\sqrt{1+\left(\frac{l_{RQ}}{r_R - \frac{1}{2}l_W}\right)^2}$$

$$r_S = \left(r_R + \frac{1}{2}l_W\right)\sqrt{1+\left(\frac{l_{RQ}}{r_R + \frac{1}{2}l_W}\right)^2}$$

The omnidirectional cameras 2 are especially formed as mirror lens cameras.

The described methods can also be carried out with only one omnidirectional camera 2 or with more than two omnidirectional cameras 2.

The described methods can in principle be carried out at arbitrary objects 1.

The cameras 2 can be arranged in the region of a roof edge of the vehicle 1.

The inner region 3 can also be described with the help of an ellipse instead of with the help of a circle.

The imaginary plane can correspond to a surface on which the vehicle 1 stands.

List of Reference Numerals

1 Object, vehicle
2 Omnidirectional camera
3 Inner region
4 First passage
4.1 to 4.3 Line
5 Second passage
6 Single track model
7 Virtual wheel
8 Instantaneous center
$C_p$ Translation of the virtual camera
$\delta_R$ Steering angle
f Focal width of the virtual camera
$I_W$ Width of the vehicle
$I_{FR}$ Distance from the front axle to the rear axle
$\Psi_Q$ Angle between the rear virtual wheel and the center of the rear bumper
r Radius
$r_F$ Movement radius of the front virtual wheel
$r_p$ Movement radius of a left outer point of the rear bumper
$r_Q$ Movement radius of a center of the rear bumper
$r_R$ Movement radius of the rear virtual wheel 6
$r_S$ Movement radius of a right outer point of the rear bumper
$R_P$ Rotation of the virtual camera
$x_p$ Pixel of the virtual camera
$X_W$ Coordinate in the object coordinate system
$X_{W,Y}$ Height of the coordinate in the object coordinate system

The invention claimed is:

1. A method for calibrating an assembly having at least one omnidirectional camera (2) that is arranged on an object (1) and an optical display unit, in which an image that is displayed by the display unit reproduces a perspective of a virtual camera above the object (1), wherein an image from the virtual camera is projected into an object coordinate system and wherein the resulting coordinates ($X_W$, $X_{W,Y}$) are projected into the omnidirectional camera, the method comprising, during the projection of the image of the virtual camera into the object coordinate system:

projecting onto a virtual plane pixels ($x_p$) of the image of the virtual camera within a virtual circle or ellipse around the object (1), while transforming pixels ($x_p$) of the image outside the circle or ellipse by the virtual camera into the object coordinate system in such a way that they are projected onto a virtual surface that rises from the edge of the circle or ellipse, wherein a height of the coordinates ($X_W$, $X_{W,Y}$) on the surface in the object coordinate system is proportional to a distance of the coordinate ($X_W$) to a center of the circle or the ellipse, and wherein a drive movement is predicted and is superposed over the image in the display unit entirely within the virtual circle or ellipse and not superposed over the virtual surface that rises from the edge of the circle or ellipse.

2. The method according to claim 1, wherein the surface has the form of a casing of a truncated cone.

3. The method according to claim 1, wherein the omnidirectional camera (2) is calibrated with regard to intrinsic parameters with the help of a calibration body, which comprises the entire field of view of the omnidirectional camera (2).

4. The method according to claim 3, wherein the calibration body has the form of a barrel, whose inner side is provided with circular markings.

5. The method for the image processing and image display by means of an assembly with at least one omnidirectional camera (2) arranged on an object (1), and an optical display unit, wherein the assembly is calibrated by means of a method according to claim 1, wherein an environment of the object (1) is recorded with the omnidirectional camera (2) and is reproduced in the display unit corresponding to the calibration.

6. The method according to claim 5, wherein images of two omnidirectional cameras (2) are recorded, which are arranged at a rear side of the vehicle (1).

7. The method according to claim 6, wherein a region with regard to the vehicle (1) detected by the omnidirectional cameras (2) is divided asymmetrically onto the omnidirectional cameras (2).

8. The method according to claim 5, wherein, with a reversing vehicle (1) and/or an engaged reverse gear, a drive movement is predicted in dependence on a steering angle ($\delta_R$) and is superposed over the image in the display unit.

9. The method according to claim 8, wherein the prediction is based on a single track model (6), where respectively two wheels of an axle are modeled by a virtual wheel (7) in the center of the axle.

10. The method according to claim 1, wherein the object (1) on which the at least one omnidirectional camera (2) is arranged is a vehicle.

11. A method for calibrating an assembly having at least one omnidirectional camera (2) that is arranged on a vehicle and an optical display unit, in which an image that is displayed by the display unit reproduces a perspective of a virtual camera above the vehicle, wherein an image from the virtual camera is projected into an object coordinate system and wherein the resulting coordinates ($X_W$, $X_{W,Y}$) are projected into the omnidirectional camera, the method comprising, during the projection of the image of the virtual camera into the object coordinate system:

projecting onto a virtual plane pixels ($x_p$) of the image of the virtual camera within a virtual circle or ellipse around the vehicle, while transforming pixels ($x_p$) of the image outside the circle or ellipse by the virtual camera into the object coordinate system in such a way that they are projected onto a virtual surface that rises from the edge of the circle or ellipse, wherein a height of the coordinates ($X_W$, $X_{W,Y}$) on the surface in the object coordinate system outside the virtual circle or ellipse is proportional to a distance of the coordinate ($X_W$) to a center of the circle or the ellipse, and wherein the radius of the virtual circle around the vehicle, or the distance from the center to the furthest point on the ellipse, is at least approximately the length of the vehicle wherein a drive movement is predicted and is superposed over the image in the display unit entirely within the virtual circle or ellipse and not superposed over the virtual surface that rises from the edge of the circle or ellipse.

* * * * *